US011387457B2

(12) United States Patent
Yamamoto

(10) Patent No.: US 11,387,457 B2
(45) Date of Patent: *Jul. 12, 2022

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventor: Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 102 days.

This patent is subject to a terminal disclaimer.

(21) Appl. No.: 15/757,723

(22) PCT Filed: Sep. 7, 2016

(86) PCT No.: PCT/JP2016/004076
§ 371 (c)(1),
(2) Date: Mar. 6, 2018

(87) PCT Pub. No.: WO2017/056404
PCT Pub. Date: Apr. 6, 2017

(65) Prior Publication Data
US 2019/0044147 A1 Feb. 7, 2019

(30) Foreign Application Priority Data
Sep. 30, 2015 (JP) ............... JP2015-194784

(51) Int. Cl.
H01M 4/62 (2006.01)
C08L 101/00 (2006.01)
H01M 4/13 (2010.01)
C08L 9/06 (2006.01)
C08L 53/02 (2006.01)
H01M 10/0525 (2010.01)

(52) U.S. Cl.
CPC ............ H01M 4/622 (2013.01); C08L 9/06 (2013.01); C08L 53/02 (2013.01); C08L 101/00 (2013.01); H01M 4/13 (2013.01); H01M 10/0525 (2013.01); C08L 2203/20 (2013.01)

(58) Field of Classification Search
CPC .... H01M 4/622; H01M 10/0525; H01M 4/13; C08L 53/02; C08L 9/06; C08L 2203/20; C08L 101/00
USPC .......................................................... 429/217
See application file for complete search history.

(56) References Cited

U.S. PATENT DOCUMENTS

| 2004/0020763 | A1* | 2/2004 | Kanzaki | H01M 10/0525 204/250 |
| 2008/0011986 | A1* | 1/2008 | Yamakawa | H01G 11/32 252/500 |
| 2013/0245208 | A1* | 9/2013 | Okada | C09J 7/387 525/92 R |
| 2013/0330622 | A1 | 12/2013 | Sasaki et al. | |
| 2014/0131630 | A1* | 5/2014 | Hwang | H01M 4/622 252/519.2 |
| 2015/0076414 | A1* | 3/2015 | Hwang | C08F 222/02 252/500 |
| 2015/0311490 | A1* | 10/2015 | Murase | H01M 4/139 524/521 |
| 2016/0049660 | A1* | 2/2016 | Hwang | H01M 4/622 429/217 |
| 2016/0233512 | A1* | 8/2016 | Park | H01M 4/13 |
| 2018/0108912 | A1* | 4/2018 | Kang | H01M 4/13 |

FOREIGN PATENT DOCUMENTS

| JP | 2003100298 A | 4/2003 |
| JP | 2006339184 A | 12/2006 |
| JP | 2012204303 A | 10/2012 |
| WO | 2007032374 A1 | 3/2007 |
| WO | 2012115096 A1 | 8/2012 |

OTHER PUBLICATIONS

Apr. 3, 2018, International Preliminary Report on Patentability issued in the International Patent Application No. PCT/JP2016/004076.
Mar. 19, 2019, the Extended European Search Report issued by the European Patent Office in the corresponding European Patent Application No. 16850585.7.
Jun Takahashi et al., In Situ Polymerization and Properties of Methyl Methacrylate-Butadiene-Styrene Resin with Bimodal Rubber Particle Size Distribution, Polymer Journal, Jul. 14, 2006, pp. 835-843, vol. 38, No. 8.
Y. Okamoto et al., Impact Improvement Mechanism of HIPS with Bimodal Distribution of Rubber Particle Size, Macromolecules, Sep. 1, 1991, pp. 5639-5644, vol. 24, No. 20.
Nov. 29, 2016, International Search Report issued in the International Patent Application No. PCT/JP2016/004076.

* cited by examiner

Primary Examiner — Christian Roldan
(74) Attorney, Agent, or Firm — Kenja IP Law PC

(57) ABSTRACT

Provided is a binder composition for a non-aqueous secondary battery electrode that enables the display of excellent peel strength and cycle characteristics. The binder composition for a non-aqueous secondary battery electrode contains a particulate polymer A and a particulate polymer B. The particulate polymer A has a volume average particle diameter of at least 0.6 μm and not more than 2.5 μm. The particulate polymer B has a volume average particle diameter of at least 0.01 μm and not more than 0.5 μm. The particulate polymer A has a percentage content of more than 30 mass % and not more than 90 mass % relative to total content of the particulate polymer A and the particulate polymer B.

5 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

This disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy-density, and the ability to be repeatedly charged and discharged, and are used in a wide range of applications. Consequently, in recent years, studies have been made to improve electrodes and other battery components with the aim of achieving even higher non-aqueous secondary battery performance.

An electrode for a secondary battery, such as a lithium ion secondary battery, normally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium, and drying the applied slurry composition.

In recent years, there have been attempts to improve binder compositions used in the formation of electrode mixed material layers in order to further improve secondary battery performance. In one specific example, it has been proposed that binding capacity between components, such as an electrode active material, in an electrode mixed material layer and binding capacity between the electrode mixed material layer and a current collector (i.e., peel strength) can be increased, and secondary battery performance can be improved through use of a binder composition that contains two types of particulate polymers of differing particle diameters as a binder.

More specifically, PTL 1, for example, proposes that the peel strength of an electrode can be increased by using a binder obtained by mixing a particulate polymer for which the modal particle diameter of primary particles is at least 0.01 μm and less than 0.25 μm and a particulate polymer for which the modal particle diameter of primary particles is at least 0.25 μm and less than 3 μm such that the particulate polymer for which the modal particle diameter of primary particles is at least 0.01 μm and less than 0.25 μm is contained in a proportion of 70 mass % to 99 mass %.

CITATION LIST

Patent Literature

PTL 1: JP 2003-100298 A

SUMMARY

Technical Problem

However, there has been demand for further improvement of secondary battery performance in recent years, and there is also room for improvement over conventional binder compositions such as described above in terms of increasing the peel strength of an electrode that is formed using the binder composition while also further improving battery characteristics (for example, cycle characteristics) of a non-aqueous secondary battery that includes the electrode.

Accordingly, one objective of this disclosure is to provide a binder composition for a non-aqueous secondary battery electrode and a slurry composition for a non-aqueous secondary battery electrode that are capable of forming an electrode for a non-aqueous secondary battery that has excellent peel strength and can cause a non-aqueous secondary battery to display excellent cycle characteristics (particularly high-temperature cycle characteristics).

Another objective of this disclosure is to provide an electrode for a non-aqueous secondary battery that has excellent peel strength and can cause a non-aqueous secondary battery to display excellent cycle characteristics (particularly high-temperature cycle characteristics).

Yet another objective of this disclosure is to provide a non-aqueous secondary battery having excellent battery characteristics such as cycle characteristics.

Solution to Problem

The inventor conducted diligent investigation with the aim of solving the problems set forth above. Through this investigation, the inventor discovered that an electrode for a secondary battery having excellent peel strength and a secondary battery having excellent battery characteristics such as cycle characteristics can be obtained through use of a binder composition that contains, in a specific content ratio, two particulate polymers having specific particle diameters that differ from one another.

Specifically, the inventor discovered that an electrode for a secondary battery can be provided with excellent binding capacity amongst an electrode active material and excellent binding capacity between the electrode active material and a current collector by forming the electrode for a secondary battery using a slurry composition containing a binder composition that contains two particulate polymers such as described above with the particulate polymer having a larger particle diameter being contained in a specific percentage content. Moreover, the inventor discovered that a secondary battery including this electrode for a secondary battery has excellent battery characteristics such as high-temperature cycle characteristics.

The inventor completed the present disclosure based on these findings.

Specifically, this disclosure aims to advantageously solve the problems set forth above by disclosing a binder composition for a non-aqueous secondary battery electrode comprising: a particulate polymer A; and a particulate polymer B, wherein the particulate polymer A has a volume average particle diameter of at least 0.6 μm and not more than 2.5 μm, the particulate polymer B has a volume average particle diameter of at least 0.01 μm and not more than 0.5 μm, and the particulate polymer A has a percentage content of more than 30 mass % and not more than 90 mass % relative to total content of the particulate polymer A and the particulate polymer B.

As a result of the binder composition containing the particulate polymer A and the particulate polymer B, and as a result of the volume average particle diameters and content ratio of the particulate polymer A and the particulate polymer B being within the ranges set forth above in this manner, it is possible to achieve good binding amongst an electrode active material and between the electrode active material and a current collector surface in an electrode formed using a slurry composition that contains the binder composition and the electrode active material. Therefore, an electrode having good peel strength can be obtained. Moreover, cycle characteristics and the like of a secondary battery that includes the electrode can be improved.

In this disclosure, "volume average particle diameter" refers to a particle diameter (D50) at which, in a particle diameter distribution (volume basis) measured by laser diffraction, cumulative volume calculated from a small diameter end of the distribution reaches 50%.

In the presently disclosed binder composition for a non-aqueous secondary battery electrode, the particulate polymer A preferably includes an aliphatic conjugated diene monomer unit in a proportion of at least 50 mass % and not more than 90 mass %. As a result of the particulate polymer A including an aliphatic conjugated diene monomer unit in the proportion set forth above, the peel strength of an electrode formed using the binder composition can be further increased, and cycle characteristics and the like of a secondary battery including the electrode can be further improved.

Moreover, the particulate polymer A preferably includes an aromatic vinyl monomer unit in a proportion of at least 10 mass % and not more than 50 mass %. As a result of the particulate polymer A including an aromatic vinyl monomer unit in the proportion set forth above, the peel strength of an electrode formed using the binder composition can be further increased, and cycle characteristics and the like of a secondary battery including the electrode can be further improved.

In this disclosure, the percentage content of an aliphatic conjugated diene monomer unit and the percentage content of an aromatic vinyl monomer unit can be measured by a nuclear magnetic resonance (NMR) method such as $^1$H-NMR.

In the presently disclosed binder composition for a non-aqueous secondary battery electrode, the particulate polymer B preferably includes an aliphatic conjugated diene monomer unit in a proportion of at least 20 mass % and not more than 60 mass %. As a result of the particulate polymer B including an aliphatic conjugated diene monomer unit in the proportion set forth above, the peel strength of an electrode formed using the binder composition can be further increased, and cycle characteristics and the like of a secondary battery including the electrode can be further improved.

Moreover, the particulate polymer B preferably includes an aromatic vinyl monomer unit in a proportion of at least 10 mass % and not more than 70 mass %. As a result of the particulate polymer B including an aromatic vinyl monomer unit in the proportion set forth above, the peel strength of an electrode formed using the binder composition can be further increased, and cycle characteristics and the like of a secondary battery including the electrode can be further improved.

The particulate polymer A is preferably a block copolymer. As a result of the particulate polymer A being a block copolymer, the peel strength of an electrode formed using the binder composition can be further improved. Moreover, the internal resistance of a secondary battery including the electrode can be reduced and a secondary battery having good rate characteristics can be obtained.

Furthermore, this disclosure aims to advantageously solve the problems set forth above by disclosing a slurry composition for a non-aqueous secondary battery electrode comprising an electrode active material and any one of the foregoing binder compositions for a non-aqueous secondary battery electrode. Through inclusion of an electrode active material and a binder composition containing the two particulate polymers set forth above, it is possible to obtain an electrode that has excellent peel strength and is capable of forming a secondary battery having excellent cycle characteristics and the like.

In the presently disclosed slurry composition for a non-aqueous secondary battery electrode, the electrode active material preferably has a tap density of 1.1 g/cm$^3$ or less. When an electrode including an electrode mixed material layer that contains this electrode active material is used in a non-aqueous secondary battery, swelling of the electrode associated with charging and discharging of the secondary battery can be inhibited as a result of the electrode active material having a tap density of 1.1 g/cm$^3$ or less. It should be noted that an electrode formed using an electrode active material that has a low tap density normally tends to suffer from a decrease in peel strength. However, by using this electrode active material in combination with a binder composition that contains, in a specific content ratio, the particulate polymer A and the particulate polymer B having specific particle diameters, the peel strength of an electrode that is formed therewith can be sufficiently improved.

In this disclosure, the "tap density" of an electrode active material can be measured by a method described in the EXAMPLES section of the present specification.

Moreover, this disclosure aims to advantageously solve the problems set forth above by disclosing an electrode for a non-aqueous secondary battery comprising an electrode mixed material layer formed using any of the foregoing slurry compositions for a non-aqueous secondary battery electrode. By using a slurry composition containing an electrode active material and a binder composition that contains the two particulate polymers set forth above in this manner, it is possible to obtain an electrode for a non-aqueous secondary battery that has excellent peel strength and can cause a non-aqueous secondary battery to display excellent cycle characteristics and the like.

Furthermore, this disclosure aims to advantageously solve the problems set forth above by disclosing a non-aqueous secondary battery comprising: a positive electrode; a negative electrode; an electrolysis solution; and a separator, wherein at least one of the positive electrode and the negative electrode is the foregoing electrode for a non-aqueous secondary battery. By using the foregoing electrode for a non-aqueous secondary battery as at least one of the positive electrode and the negative electrode in this manner, it is possible to obtain a non-aqueous secondary battery having excellent battery characteristics such as cycle characteristics.

Advantageous Effect

According to this disclosure, it is possible to provide a binder composition for a non-aqueous secondary battery electrode and a slurry composition for a non-aqueous secondary battery electrode that are capable of forming an electrode for a non-aqueous secondary battery that has excellent peel strength and can cause a non-aqueous secondary battery to display excellent cycle characteristics.

Moreover, according to this disclosure, it is possible to provide an electrode for a non-aqueous secondary battery that has excellent peel strength and can cause a non-aqueous secondary battery to display excellent cycle characteristics.

Furthermore, according to this disclosure, it is possible to provide a non-aqueous secondary battery having excellent battery characteristics such as cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode of a non-aqueous secondary battery such as a lithium ion secondary battery (i.e., an electrode for a non-aqueous secondary battery). Furthermore, the presently disclosed non-aqueous secondary battery includes an electrode for a non-aqueous secondary battery formed using the presently disclosed slurry composition for a non-aqueous secondary battery electrode.

Note that the presently disclosed binder composition for a non-aqueous secondary battery electrode and slurry composition for a non-aqueous secondary battery electrode are particularly suitable for use in formation of a negative electrode of a non-aqueous secondary battery.

(Binder Composition for Non-Aqueous Secondary Battery Electrode)

The presently disclosed binder composition for a non-aqueous secondary battery electrode contains a particulate polymer A and a particulate polymer B that have different volume average particle diameters to one another, and may optionally further contain other components that can be included in secondary battery electrodes. Moreover, the presently disclosed binder composition for a non-aqueous secondary battery electrode may further contain a dispersion medium such as water. In the presently disclosed binder composition for a non-aqueous secondary battery electrode, the particulate polymer A has a volume average particle diameter of at least 0.6 μm and not more than 2.5 μm, and the particulate polymer B has a volume average particle diameter of at least 0.01 μm and not more than 0.5 μm. Moreover, the content ratio (A:B) of the particulate polymer A relative to the particulate polymer B in the presently disclosed binder composition for a non-aqueous secondary battery electrode is more than 30:70 and not more than 90:10.

Thus, the presently disclosed binder composition for a non-aqueous secondary battery electrode contains both the particulate polymer A having a specific volume average particle diameter and the particulate polymer B having a specific volume average particle diameter in specific proportions. When a slurry composition containing the presently disclosed binder composition is used in formation of an electrode mixed material layer of an electrode, good binding amongst the electrode active material and between the electrode active material and a current collector can be achieved as a result of the make-up of the presently disclosed binder composition being as set forth above. Accordingly, an electrode having excellent peel strength can be obtained using the presently disclosed binder composition for a non-aqueous secondary battery electrode. Moreover, by using an electrode formed using a slurry composition that contains a binder composition containing the particulate polymer A and the particulate polymer B in specific proportions, it is possible to cause a non-aqueous secondary battery to display excellent battery characteristics, and particularly high-temperature cycle characteristics.

<Particulate Polymer A>

In an electrode obtained by forming an electrode mixed material layer on a current collector using a slurry composition for a non-aqueous secondary battery electrode produced using the binder composition, the particulate polymer A holds components contained in the electrode mixed material layer to prevent these components detaching from the electrode mixed material layer (i.e., the particulate polymer A functions as a binder).

[Properties of Particulate Polymer A]

The particulate polymer A used in this disclosure has a particle diameter within a specific range described below. As a result of the particulate polymer A having a specific particle diameter that is large compared to the particulate polymer B, it is possible to form an electrode that has good peel strength and can cause a secondary battery to display good cycle characteristics and the like.

[[Volume Average Particle Diameter]]

Specifically, the particulate polymer A is required to have a volume average particle diameter of at least 0.6 μm and not more than 2.5 μm. The volume average particle diameter of the particulate polymer A is preferably 0.7 μm or more, and more preferably 0.8 μm or more, and is preferably 2.0 μm or less, and more preferably 1.5 μm or less.

As a result of the particulate polymer A having a volume average particle diameter of 0.6 μm or more, the peel strength of an electrode obtained using a slurry composition that contains the binder composition can be increased. Although it is not clear why the peel strength is increased, the reason for this increase is presumed to be as follows. Specifically, in production of a slurry composition using an electrode active material and the binder composition containing the particulate polymer A, the particulate polymer A is restricted from entering sites that do not contribute to binding (for example, pores of the electrode active material) as a consequence of the particulate polymer A having a comparatively large particle diameter of at least a specific size. This results in favorable adsorption of the particulate polymer A at sites that do contribute to binding (for example, on the surface of the electrode active material).

Moreover, as a result of the volume average particle diameter of the particulate polymer A being 2.5 μm or less, a decrease in contact area between the particulate polymer A and the electrode active material can be suppressed, and good electrode peel strength can be maintained. Moreover, battery characteristics such as cycle characteristics of a secondary battery that includes the electrode can be improved.

The volume average particle diameter of the particulate polymer A can be adjusted to within a desired range by, for example, altering the polymerization method and polymerization conditions, or performing sedimentation and classification of an obtained polymer.

[Make-Up of Particulate Polymer A]

Any particulate polymer that can function as a binder may be used as the particulate polymer A without any specific limitations. Specific examples of the particulate polymer A include an acrylic polymer; a vinylbenzene polymer such as polyvinylbenzene or styrene-divinylbenzene copolymer; a vinyl alcohol polymer such as polyvinyl alcohol, modified polyvinyl alcohol, or ethylene-vinyl alcohol copolymer; a polymer including an aliphatic conjugated diene monomer unit; and a polymer including an aromatic vinyl monomer unit. One of these particulate polymers may be used individually, or two or more of these particulate polymers may be used in combination in a freely selected ratio. Of these examples, the particulate polymer A is preferably a polymer including an aliphatic conjugated diene monomer unit and/or an aromatic vinyl monomer unit, and more preferably a polymer including an aliphatic conjugated diene monomer unit and an aromatic vinyl monomer unit. Note that the particulate polymer A may contain monomer units other than the aliphatic conjugated diene monomer unit and the aromatic vinyl monomer unit (hereinafter, also referred to as "other monomer units").

[[Aliphatic Conjugated Diene Monomer Unit]]

Examples of aliphatic conjugated diene monomers that can be used to form the aliphatic conjugated diene monomer unit include, but are not specifically limited to, 1,3-butadiene, 2-methyl-1,3-butadiene (isoprene), 2,3-dimethyl-1,3-butadiene, 2-ethyl-1,3-butadiene, 1,3-pentadiene, and 2-chloro-1,3-butadiene. Of these aliphatic conjugated diene monomers, 1,3-butadiene and isoprene are preferable, and isoprene is more preferable. One aliphatic conjugated diene monomer may be used individually, or two or more aliphatic conjugated diene monomers may be used in combination in a freely selected ratio.

—Percentage Content of Aliphatic Conjugated Diene Monomer Unit—

The proportion constituted by the aliphatic conjugated diene monomer unit in the particulate polymer A when the amount of all monomer units in the particulate polymer A is taken to be 100 mass % is preferably 50 mass % or more, more preferably 55 mass % or more, and even more preferably 60 mass % or more, and is preferably 90 mass % or less. When the percentage content of the aliphatic conjugated diene monomer unit is at least any of the lower limits set forth above, the peel strength of an electrode obtained using a slurry composition that contains the binder composition can be sufficiently improved. Moreover, when the percentage content of the aliphatic conjugated diene monomer unit is not more than the upper limit set forth above, cycle characteristics and the like of a secondary battery including the electrode can be further improved.

[[Aromatic Vinyl Monomer Unit]]

Examples of aromatic vinyl monomers that can be used to form the aromatic vinyl monomer unit include, but are not specifically limited to, styrene, styrenesulfonic acid and salts thereof, α-methylstyrene, p-t-butyl styrene, butoxystyrene, vinyltoluene, chlorostyrene, and vinylnaphthalene. Of these aromatic vinyl monomers, styrene is preferable.

—Percentage Content of Aromatic Vinyl Monomer Unit—

The proportion constituted by the aromatic vinyl monomer unit in the particulate polymer A when the amount of all monomer units in the particulate polymer A is taken to be 100 mass % is preferably 10 mass % or more, and is preferably 50 mass % or less, more preferably 45 mass % or less, and even more preferably 40 mass % or less. When the percentage content of the aromatic vinyl monomer unit is not more than any of the upper limits set forth above, the peel strength of an electrode formed using a slurry composition that contains the binder composition can be further improved. Moreover, when the percentage content of the aromatic vinyl monomer unit is at least the lower limit set forth above, cycle characteristics and the like of a secondary battery including the electrode can be further improved.

[[Other Monomer Units]]

Examples of monomer units other than the above-described aliphatic conjugated diene monomer unit and aromatic vinyl monomer unit that may be included in the particulate polymer A include, but are not specifically limited to, repeating units derived from known monomers that are copolymerizable with aliphatic conjugated diene monomers and aromatic vinyl monomers such as described above. Specific examples of other monomer units include, but are not specifically limited to, a (meth)acrylic acid ester monomer unit and a hydrophilic group-containing monomer unit.

One of these monomers may be used individually, or two or more of these monomers may be used in combination. Note that in this disclosure, "(meth)acryl" is used to indicate "acryl" and/or "methacryl".

Examples of (meth)acrylic acid ester monomers that can be used to form the (meth)acrylic acid ester monomer unit include alkyl esters of acrylic acid such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl esters of methacrylic acid such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that can be used to form the hydrophilic group-containing monomer unit include polymerizable monomers having a hydrophilic group. Specific examples of hydrophilic group-containing monomers include carboxylic acid group-containing monomers, sulfonate group-containing monomers, phosphate group-containing monomers, and hydroxy group-containing monomers.

Examples of carboxylic acid group-containing monomers include monocarboxylic acids and derivatives thereof; and dicarboxylic acids, acid anhydrides thereof, and derivatives of dicarboxylic acids and acid anhydrides thereof.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, and 3-allyloxy-2-hydroxypropane sulfonic acid.

In this disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as acrylic acid-2-hydroxyethyl (2-hydroxyethyl acrylate), acrylic acid-2-hydroxypropyl, methacrylic acid-2-hydroxyethyl, methacrylic acid-2-hydroxypropyl, maleic acid-di-2-hydroxyethyl, maleic acid-di-4-hydroxybutyl, and itaconic acid-di-2-hydroxypropyl; esters of (meth)acrylic acid and polyalkylene glycol represented by a general formula $CH_2=CR^1—COO—(C_qH_{2q}O)_p—H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

[Block Copolymer]

The particulate polymer A is preferably a block copolymer. When the particulate polymer A is a block copolymer, electrode peel strength can be further improved, and secondary battery rate characteristics and the like can be improved.

The block copolymer forming the particulate polymer A preferably includes the above-described aliphatic conjugated diene monomer unit and aromatic vinyl monomer unit. In other words, the block polymer preferably includes a block region formed from aliphatic conjugated diene monomer units and a block region formed from aromatic vinyl monomer units. Through inclusion of a block region formed from aliphatic conjugated diene monomer units and a block region formed from aromatic vinyl monomer units, electrode peel strength, secondary battery rate characteristics, and the like can be further improved through the action of each of the block regions.

Note that the block copolymer may further include block regions formed from other monomer units. The types of monomers that can be used to form the monomer units in the block copolymer and the preferable percentage content of each type of monomer unit are as previously described.

The structure of the block copolymer forming the particulate polymer A may be any structure such as a diblock structure including one each of two types of block regions (for example, a structure composed of a block region formed from aliphatic conjugated diene monomer units and a block region formed from aromatic vinyl monomer units), or a triblock structure including three block regions (for example, a structure composed of a block region formed from aromatic vinyl monomer units, a block region formed from aliphatic conjugated diene monomer units, and a block region formed from aromatic vinyl monomer units).

[[Percentage Content of Copolymer Having Diblock Structure]]

The proportion constituted by a copolymer having a diblock structure (diblock content) in the entire particulate polymer A is preferably 5 mass % or more, and more preferably 10 mass % or more, and is preferably 90 mass % or less, and more preferably 75 mass % or less. This is because an electrode having high peel strength and a secondary battery having low battery resistance (for example, good rate characteristics) can be obtained when the percentage content of the copolymer having a diblock structure is within any of the ranges set forth above. Specifically, battery characteristics such as rate characteristics can be improved when the percentage content of the copolymer having a diblock structure is at least any of the lower limits set forth above. Moreover, high peel strength can be ensured when the percentage content of the copolymer having a diblock structure is not more than any of the upper limits set forth above.

The diblock content can be measured from the area ratio of peaks corresponding to each block copolymer that are obtained using a high-performance liquid chromatograph (values in terms of standard polystyrene).

The diblock content can be adjusted by altering the type of coupling agent used in production of the particulate polymer A described below.

[Production of Particulate Polymer A]

No specific limitations are placed on the mode of polymerization of the particulate polymer A. For example, any of solution polymerization, suspension polymerization, bulk polymerization, and emulsion polymerization may be used. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used and the amount thereof may also be the same as typically used.

Moreover, in a case in which the particulate polymer A used in this disclosure is a block copolymer, the block copolymer may be produced by a conventional and commonly known method. Specifically, the block copolymer may be produced by, for example, obtaining a solution of a polymerized first monomer component, adding a second monomer component differing from the first monomer component to this solution and performing polymerization thereof, and then optionally further repeating addition and polymerization of monomer components.

From a viewpoint of producing a desired block copolymer, it is preferable that phase-inversion emulsification is performed using the resultant polymer solution and an aqueous solution, and then the emulsified product is separated.

The phase-inversion emulsification may be carried out, for example, using a known emulsifying and dispersing device. Moreover, the separation may be carried out, for example, using a known chromatographic column. However, these are not intended to be limitations.

<Particulate Polymer B>

In an electrode obtained by forming an electrode mixed material layer on a current collector using a slurry composition for a non-aqueous secondary battery electrode produced using the binder composition, the particulate polymer B holds components contained in the electrode mixed material layer to prevent these components detaching from the electrode mixed material layer (i.e., the particulate polymer B functions as a binder in conjunction with the previously described particulate polymer A).

[Properties of Particulate Polymer B]

The particulate polymer B used in this disclosure has a particle diameter within a specific range described below. As a result of the particulate polymer B having a specific particle diameter that is small compared to the particulate polymer A used therewith, it is possible to form an electrode that has good peel strength and can cause a secondary battery to display good cycle characteristics and the like.

[[Volume Average Particle Diameter]]

The particulate polymer B is required to have a volume average particle diameter of at least 0.01 μm and not more than 0.5 μm. The volume average particle diameter of the particulate polymer B is preferably 0.07 μm or more, and more preferably 0.12 μm or more, and is preferably 0.3 μm or less, and more preferably 0.25 μm or less.

When an electrode is formed using a slurry composition containing the above-described particulate polymer A and particulate polymer B, the electrode can display excellent peel strength as a result of the volume average particle diameter of the particulate polymer B being 0.01 μm or more. Moreover, as a result of the volume average particle diameter of the particulate polymer B being 0.5 μm or less, high binding force amongst an electrode active material and between the electrode active material and a current collector can be maintained while also improving cycle characteristics and the like of a secondary battery including the electrode.

[Make-Up of Particulate Polymer B]

Any particulate polymer that can function as a binder may be used as the particulate polymer B without any specific limitations. Specific examples of the particulate polymer B include an acrylic polymer; a vinylbenzene polymer such as polyvinylbenzene or styrene-divinylbenzene copolymer; a vinyl alcohol polymer such as polyvinyl alcohol, modified polyvinyl alcohol, or ethylene-vinyl alcohol copolymer; a polymer including an aliphatic conjugated diene monomer unit; and a polymer including an aromatic vinyl monomer unit. One of these particulate polymers may be used individually, or two or more of these particulate polymers may be used in combination in a freely selected ratio. Of these examples, the particulate polymer B is preferably a polymer including an aliphatic conjugated diene monomer unit and/or an aromatic vinyl monomer unit, and more preferably a polymer including an aliphatic conjugated diene monomer unit and an aromatic vinyl monomer unit. Note that the particulate polymer B may contain monomer units other than the aliphatic conjugated diene monomer unit and the aromatic vinyl monomer unit.

The particulate polymer B is preferably a random polymer.

[[Aliphatic Conjugated Diene Monomer Unit]]

Examples of aliphatic conjugated diene monomers that can be used to form the aliphatic conjugated diene monomer unit include, but are not specifically limited to, the same aliphatic conjugated diene monomers as described in relation to the particulate polymer A. Of these aliphatic conjugated diene monomers, 1,3-butadiene and isoprene are preferable, and 1,3-butadiene is more preferable. One aliphatic conjugated diene monomer may be used individually, or two or more aliphatic conjugated diene monomers may be used in combination in a freely selected ratio.

—Percentage Content of Aliphatic Conjugated Diene Monomer Unit—

The proportion constituted by the aliphatic conjugated diene monomer unit in the particulate polymer B when the amount of all monomer units in the particulate polymer B is taken to be 100 mass % is preferably 20 mass % or more, more preferably 25 mass % or more, and even more preferably 30 mass % or more, and is preferably 60 mass % or less, preferably 55 mass % or less, and preferably 50 mass % or less. When the percentage content of the aliphatic conjugated diene monomer unit is at least any of the lower limits set forth above, the peel strength of an electrode obtained using a slurry composition that contains the binder composition can be sufficiently improved. Moreover, when the percentage content of the aliphatic conjugated diene monomer unit in not more than any of the upper limits set forth above, cycle characteristics and the like of a secondary battery including the electrode can be further improved.

[[Aromatic Vinyl Monomer Unit]]

Examples of aromatic vinyl monomers that can be used to form the aromatic vinyl monomer unit include, but are not specifically limited to, the same aromatic vinyl monomers as described in relation to the particulate polymer A. Of these aromatic vinyl monomers, styrene is preferable.

—Percentage Content of Aromatic Vinyl Monomer Unit—

The proportion constituted by the aromatic vinyl monomer unit in the particulate polymer B when the amount of all monomer units in the particulate polymer B is taken to be 100 mass % is preferably 10 mass % or more, more preferably 15 mass % or more, and even more preferably 40 mass % or more, and is preferably 70 mass % or less, more preferably 68 mass % or less, and even more preferably 65 mass % or less. When the percentage content of the aromatic vinyl monomer unit is not more than any of the upper limits set forth above, the peel strength of an electrode formed using a slurry composition that contains the binder composition can be further improved. Moreover, when the percentage content of the aromatic vinyl monomer unit is at least any of the lower limits set forth above, cycle characteristics and the like of a secondary battery including the electrode can be further improved.

[[Other Monomer Units]]

Examples of monomer units other than the above-described aliphatic conjugated diene monomer unit and aromatic vinyl monomer unit that may be included in the particulate polymer B include, but are not specifically limited to, the same other monomer units as described in relation to the particulate polymer A. Of these other monomer units, a hydrophilic group-containing monomer unit is preferable.

Examples of hydrophilic group-containing monomers that can be used to form the hydrophilic group-containing monomer unit in the particulate polymer B include the same hydrophilic group-containing monomers as described in relation the particulate polymer A. Of these hydrophilic group-containing monomers, itaconic acid as a carboxylic acid group-containing monomer and 2-hydroxyethyl acrylate as a hydroxy group-containing monomer are more preferable.

[Production of Particulate Polymer B]

No specific limitations are placed on the mode of polymerization of the particulate polymer B. For example, any of solution polymerization, suspension polymerization, bulk polymerization, and emulsion polymerization may be used. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used and the amount thereof may also be the same as typically used.

<Content Ratio of Particulate Polymer A and Particulate Polymer B>

The percentage content of the particulate polymer A in the presently disclosed binder composition for a non-aqueous secondary battery electrode is required to be more than 30 mass % and not more than 90 mass % relative to total content of the particulate polymer A and the particulate polymer B. Note that in this case, the percentage content of the particulate polymer B in the presently disclosed binder composition for a non-aqueous secondary battery electrode is at least 10 mass % and less than 70 mass % relative to total content of the particulate polymer A and the particulate polymer B. The percentage content of the particulate polymer A, relative to total content of the particulate polymer A and the particulate polymer B, is preferably 35 mass % or more, and more preferably 40 mass % or more, and is preferably 85 mass % or less, and more preferably 80 mass % or less.

As a result of the percentage content of the particulate polymer A being more than 30 mass % (i.e., the percentage content of the particulate polymer B being less than 70 mass %), an increase in electrode mixed material layer resistance caused by dense aggregation therein of the particulate polymer B having a comparatively small volume average particle diameter can be inhibited. Accordingly, a produced secondary battery can be provided with good battery characteristics at low-temperature (for example, rate characteristics). Moreover, as a result of the percentage content of the particulate polymer A being more than 30 mass %, an electrode obtained using a slurry composition that contains the binder composition has excellent peel strength, and a secondary battery including the electrode can display good cycle characteristics.

Moreover, as a result of the percentage content of the particulate polymer A being 90 mass % or less (i.e., the percentage content of the particulate polymer B being 10 mass % or more), a decrease in slurry composition dispersion stability caused by sedimentation of the particulate polymer A having a comparatively large volume average particle diameter can be inhibited.

It should be noted that the binder composition may further contain a polymer other than the particulate polymer A and the particulate polymer B as a binder.

<Dispersion Medium>

The dispersion medium contained in the presently disclosed binder composition for a non-aqueous secondary battery electrode is not specifically limited and may, for example, be water. Note that the dispersion medium may be an aqueous solution or may be a mixed solution of water and a small amount of an organic solvent.

<Other Components>

The presently disclosed binder composition for a non-aqueous secondary battery electrode may, besides the components described above, contain other components such as a reinforcing material, a leveling agent, a viscosity modifier, and an additive for electrolysis solution. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production of Binder Composition for Non-Aqueous Secondary Battery Electrode>

The presently disclosed binder composition for a non-aqueous secondary battery electrode can be produced by mixing the particulate polymer A, the particulate polymer B, and other optional components in the presence of the dispersion medium without any specific limitations other than that the particulate polymer A having the specific particle diameter described above and the particulate polymer B having the specific particle diameter described above are contained in the specific proportions described above. Note that in a situation in which a dispersion liquid of a particulate polymer is used in production of the binder composition, liquid content of this dispersion liquid may be used as the dispersion medium of the binder composition.

(Slurry Composition for Non-Aqueous Secondary Battery Electrode)

The presently disclosed slurry composition for a non-aqueous secondary battery electrode contains an electrode active material and the presently disclosed binder composition for a non-aqueous secondary battery electrode set forth above, and may optionally further contain other components. In other words, the presently disclosed slurry composition for a non-aqueous secondary battery electrode normally contains an electrode active material, the above-described particulate polymer A and particulate polymer B, and a dispersion medium, and optionally further contains other components. When the presently disclosed slurry composition for a non-aqueous secondary battery electrode is used to form an electrode mixed material layer of an electrode, good binding amongst the electrode active material and between the electrode active material and a current collector can be achieved as a result of the binder composition set forth above being contained therein. Accordingly, an electrode having excellent peel strength can be obtained using the presently disclosed slurry composition for a non-aqueous secondary battery electrode. Moreover, through use of an electrode formed using the slurry composition containing the binder composition set forth above, a non-aqueous secondary battery can be caused to display excellent battery characteristics, and particularly cycle characteristics.

Although the following describes, as one example, a case in which the slurry composition for a non-aqueous secondary battery electrode is a slurry composition for a lithium ion secondary battery negative electrode, the present disclosure is not limited to the following example.

<Electrode Active Material>

The electrode active material is a material that accepts and donates electrons in an electrode of a secondary battery. The negative electrode active material of a lithium ion secondary battery is normally a material that can occlude and release lithium.

Specific examples of negative electrode active materials for lithium ion secondary batteries include carbon-based negative electrode active materials, metal-based negative electrode active materials, and negative electrode active materials formed by combining these materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

[Properties of Electrode Active Material]

The tap density of the electrode active material is preferably 1.1 g/cm³ or less, more preferably 1.05 g/cm³ or less, and even more preferably 1.03 g/cm³ or less. The electrode active material expands and contracts in accompaniment to charging and discharging, but when the tap density of the electrode active material is not more than any of the upper limits set forth above, it is possible to form an electrode that tends not to swell in association with charging and discharging. The tap density of the electrode active material is normally 0.7 g/cm³ or more.

An electrode active material having a low tap density normally has fine protrusions and recesses. Consequently, in a situation in which only a particulate polymer having a small particle diameter is used as a binder, it may not be possible to achieve good binding of the electrode active material because the particulate polymer may enter the recesses of the low-tap density electrode active material. On the other hand, in a situation which only a particulate polymer having a large particle diameter is used as a binder, it may not be possible to achieve good binding of the electrode active material because contact area of the electrode active material and the particulate polymer is reduced. However, as a result of the presently disclosed slurry composition for a non-aqueous secondary battery electrode containing the above-described particulate polymer A having a specific volume average particle diameter and the above-described particulate polymer B having a specific volume average particle diameter in specific percentage contents, an electrode having excellent peel strength can be formed even in a case in which an electrode active material having a low tap density is used.

<Other Components>

Examples of other components that may be contained in the slurry composition include, but are not specifically limited to, the same other components as may be contained in the presently disclosed binder composition. It is preferable that carboxymethyl cellulose is used as a viscosity modifier from a viewpoint of obtaining excellent coatability through thickening.

The slurry composition may further contain a conductive material such as carbon black. One of such other components may be used individually, or two or more of such other components may be used in combination in a freely selected ratio.

<Production of Slurry Composition for Non-Aqueous Secondary Battery Electrode>

The slurry composition set forth above may be produced by dispersing or dissolving the above-described components in a dispersion medium such as water. Specifically, the slurry composition may be produced by mixing the components and the dispersion medium using a mixer such as a ball mill, a sand mill, a bead mill, a pigment disperser, a grinding machine, an ultrasonic disperser, a homogenizer, a planetary mixer, or a FILMIX. Mixing of the components and the dispersion medium may normally be performed for a period of from 10 minutes to several hours in a temperature range of from room temperature to 80° C. The dispersion medium that is used in production of the slurry composition may be the same type of dispersion medium as in the binder composition. Moreover, the dispersion medium used in production of the slurry composition may include the dispersion medium that was contained in the binder composition.

(Electrode for Non-Aqueous Secondary Battery)

The presently disclosed electrode for a non-aqueous secondary battery includes an electrode mixed material layer formed using the slurry composition for a non-aqueous secondary battery electrode set forth above, and normally includes a current collector having the electrode mixed material layer formed thereon. The electrode mixed material layer contains at least the electrode active material and polymer derived from the particulate polymer A and the particulate polymer B. It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition.

In the presently disclosed electrode for a non-aqueous secondary battery, good binding between the electrode mixed material layer and the current collector is achieved as a result of a slurry composition that contains the presently disclosed binder composition for a non-aqueous secondary battery electrode being used. Thus, the presently disclosed electrode for a non-aqueous secondary battery has excellent peel strength. Moreover, as a result of the presently disclosed electrode for a non-aqueous secondary battery being formed using a slurry composition that contains the presently disclosed binder composition for a non-aqueous secondary battery electrode, a secondary battery having excellent battery characteristics such as cycle characteristics can be obtained using the electrode.

<Formation of Electrode for Non-Aqueous Secondary Battery>

The presently disclosed electrode for a non-aqueous secondary battery is produced, for example, through a step of applying the slurry composition set forth above onto the current collector (application step), and a step of drying the slurry composition that has been applied onto the current collector to form the electrode mixed material layer on the current collector (drying step).

[Application Step]

The slurry composition may be applied onto the current collector by a commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

[Drying Step]

The slurry composition on the current collector may be dried by a commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector, to thereby obtain an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes a positive electrode, a negative electrode, an electrolysis solution, and a separator, wherein the presently disclosed electrode for a non-aqueous secondary battery set forth above is used as at least one of the positive electrode and the negative electrode. The presently disclosed non-aqueous secondary battery has excellent battery characteristics such as cycle characteristics as a result of including the presently disclosed electrode for a non-aqueous secondary battery.

It is preferable that the presently disclosed electrode for a non-aqueous secondary battery is used as the negative electrode in the presently disclosed non-aqueous secondary battery. Although the following describes, as one example, a case in which the non-aqueous secondary battery is a lithium ion secondary battery, the present disclosure is not limited to the following example.

<Electrodes>

As explained above, the presently disclosed electrode for a non-aqueous secondary battery is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

Note that when a known electrode other than the presently disclosed electrode for a non-aqueous secondary battery is used, this electrode may be an electrode that is obtained by forming an electrode mixed material layer on a current collector by a known production method.

<Electrolysis Solution>

The electrolysis solution is normally an organic electrolysis solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent that is used in the electrolysis solution is not specifically limited so long as the supporting electrolyte dissolves therein. Suitable examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferred for their high dielectric constant and broad stable potential region.

The concentration of the electrolyte in the electrolysis solution may be adjusted as appropriate and is, for example, preferably 0.5 mass % to 15 mass %, more preferably 2 mass % to 13 mass %, and even more preferably 5 mass % to 10 mass %. Known additives such as vinylene carbonate (VC), fluoroethylene carbonate, and ethyl methyl sulfone may be added to the electrolysis solution.

<Separator>

The separator may, for example, be a separator such as described in JP 2012-204303 A, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolysis solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used in the examples and comparative examples to measure and evaluate the volume average particle diameter of particulate polymers A and B, the percentage content of an aliphatic conjugated diene monomer unit, an aromatic vinyl monomer unit, and other optional monomer units in the particulate polymers A and B, the percentage content of a copolymer having a diblock structure in the particulate polymer A, the tap density of an electrode active material, the peel strength of an electrode, and the cycle characteristics and rate characteristics of a secondary battery.

<Volume Average Particle Diameter>

The volume average particle diameter (D50) of particulate polymers A and B produced in the examples and comparative examples was measured using a laser diffraction particle diameter distribution analyzer (produced by Beckman Coulter, Inc.; product name: LS-230). Specifically, a water dispersion in which the solid content concentration of the particulate polymer A or the particulate polymer B had been adjusted to 0.1 mass % was measured using the aforementioned analyzer, and the volume average particle diameter (μm) was determined to be a particle diameter at which, in the obtained particle size distribution (volume basis), cumulative volume calculated from the small diameter end of the distribution reached 50%. The measurement results are shown in Table 1.

<Percentage Content of Monomer Units>

A measurement sample was prepared by coagulating a water dispersion of the particulate polymer A or the particulate polymer B in methanol, and then performing vacuum drying for 5 hours at a temperature of 100° C. The proportions (mass %) constituted by an aliphatic conjugated diene monomer unit, an aromatic vinyl monomer unit, and other optional monomer units in the measurement sample were measured by $^1$H-NMR. The measurement results are shown in Table 1.

<Percentage Content of Copolymer Having Diblock Structure>

The percentage content of a copolymer having a diblock structure (diblock content) in the particulate polymer A was measured as molecular weight in terms of polystyrene using a high-performance liquid chromatograph (device: model "HLC8220" produced by Tosoh Corporation). In the measurement, three connected columns (produced by Showa Denko K.K.; model: Shodex KF-404HQ; column temperature: 40° C.; carrier: tetrahydrofuran at flow rate of 0.35 mL/minute) were used, and a differential refractometer and an ultraviolet detector were used as a detector. Molecular weight calibration was performed for 12 standard polystyrene (produced by Polymer Laboratories Ltd.; standard molecular weight: 500 to 3,000,000) points. The diblock content (mass %) was determined from the area ratio of peaks corresponding to each block copolymer in a chart obtained using the high-performance liquid chromatograph. The measurement results are shown in Table 1.

<Tap Density>

The tap density of a negative electrode active material was measured using a Powder Tester® (Powder Tester is a registered trademark in Japan, other countries, or both) produced by Hosokawa Micron Corporation (product name: PT-D). Specifically, a powder of the negative electrode active material that had been loaded into a measurement vessel was first levelled off at the top surface of the vessel. Next, a cap provided with the measurement device was attached to the measurement vessel and further negative electrode active material powder was added up to an upper edge of the attached cap. Tapping was then performed by repeatedly dropping the measurement vessel 180 times from a height of 1.8 cm. After this tapping, the cap was removed, and the negative electrode active material powder was once again levelled off at the upper surface of the vessel. The tapped and levelled sample was weighed, and the bulk density in this state was measured as the packed bulk density (i.e., the tap density (g/cm$^3$)). The measurement results are shown in Table 1.

<Peel Strength>

A produced negative electrode was cut out as a rectangle of 100 mm in length by 10 mm in width to obtain a specimen. The specimen was placed with the surface of the negative electrode mixed material layer underneath, and cellophane tape was affixed to the surface of the negative electrode mixed material layer. Tape prescribed by HS Z1522 was used as the cellophane tape. Moreover, the cellophane tape was fixed to a test bed. Thereafter, one end of the current collector was pulled vertically upward at a pulling speed of 50 mm/minute to peel off the current collector, and the stress during this peeling was measured. This measurement was made three times and an average value of the stress was determined. The average value was taken to be the peel strength. A larger peel strength indicates larger binding force of the negative electrode mixed material layer to the current collector, and thus indicates stronger adhesion. The evaluation results are shown in Table 1.

A: Peel strength of 24 N/m or more
  B: Peel strength of at least 19 N/m and less than 24 N/m.
  C: Peel strength of at least 14 N/m and less than 19 N/m
  D: Peel strength of less than 14 N/m <Cycle Characteristics>

A produced lithium ion secondary battery having a capacity of 800 mAh was left for 24 hours at an ambient temperature of 25° C. Thereafter, the lithium ion secondary battery was subjected to a charge/discharge operation at an ambient temperature of 25° C. of charging to 4.35 V at a charge rate of 1 C and discharging to 3.0 V at a discharge rate of 1 C, and the initial capacity C0 was measured. The lithium ion secondary battery was also repeatedly subjected to the same charge/discharge operation at an ambient temperature of 45° C., and the capacity C1 after 300 cycles was measured. The capacity maintenance rate $\Delta C=(C1/C0)\times 100$ (%) was calculated, and was evaluated by the following standard. A higher capacity maintenance rate indicates a smaller decrease of discharge capacity, and thus indicates better cycle characteristics (particularly high-temperature cycle characteristics). The evaluation results are shown in Table 1.

A: Capacity maintenance rate $\Delta C$ of 80% or more

B: Capacity maintenance rate $\Delta C$ of at least 75% and less than 80%

C: Capacity maintenance rate $\Delta C$ of at least 70% and less than 75%

D: Capacity maintenance rate $\Delta C$ of less than 70%

<Rate Characteristics>

A produced lithium ion secondary battery having a capacity of 800 mAh was left for 24 hours at an ambient temperature of 25° C. The lithium ion secondary battery that had been left was then fully charged to 4.2 V at a rate of 0.2 C and an ambient temperature of 25° C. by a constant-current constant-voltage method (cut-off condition: 0.02 C). Thereafter, the lithium ion secondary battery was constant-current discharged to 3.0 V at a rate of 0.2 C and an ambient temperature of 25° C., and the discharge capacity after discharge was taken to be the initial capacity. Next, the lithium ion secondary battery was fully charged to 4.2 V at a rate of 0.2 C and an ambient temperature of 25° C. by a constant-current constant-voltage method (cut-off condition: 0.02 C). Thereafter, the lithium ion secondary battery was constant-current discharged to 3.0 V at a rate of 0.2 C and an ambient temperature of −10° C., and the discharge capacity C1 after discharge was measured. The lithium ion secondary battery was then returned to an ambient temperature of 25° C. and was fully charged again to 4.2 V at a rate of 0.2 C by a constant-current constant-voltage method (cut-off condition: 0.02 C). Thereafter, the lithium ion secondary battery was constant-current discharged to 3.0 V at a rate of 1 C and an ambient temperature of −10° C., and the discharge capacity C2 after discharge was measured.

Rate characteristics at low-temperature were evaluated by the following standard using the capacity maintenance rate indicated by the ratio of C2 relative to C1 ($C_2/C_1=C2/C1\times 100(\%)$). A larger capacity maintenance rate indicates that the lithium ion secondary battery has better low-temperature rate characteristics. The evaluation results are shown in Table 1.

A: Capacity maintenance rate ($C_2/C_1$) of 55% or more

B: Capacity maintenance rate ($C_2/C_1$) of at least 50% and less than 55%

C: Capacity maintenance rate ($C_2/C_1$) of at least 45% and less than 50%

D: Capacity maintenance rate ($C_2/C_1$) of less than 45%

Example 1

<Production of Particulate Polymer A>

A reaction vessel that was equipped with a stirrer and had been sufficiently internally purged with nitrogen was charged with 10 parts of dehydrated styrene as an aromatic vinyl monomer, 550 parts of dehydrated cyclohexane, and 0.475 parts of n-butyl ether, and stirring at 60° C. was initiated. Next, 0.485 parts of n-butyllithium (15% cyclohexane solution) was added to the stirred mixture as a polymerization initiator to initiate polymerization and a reaction was carried out under stirring for 1 hour at 60° C. The polymerization conversion rate at this point was 99.5%. This polymerization conversion rate was measured using a gas chromatograph (model "6850N" produced by Agilent Technologies).

Next, 86 parts of dehydrated isoprene was added as an aliphatic conjugated diene monomer, and stirring at 60° C. was continued for 30 minutes to continue polymerization. The polymerization conversion rate at this point was 99%.

Next, 0.5 parts of a mixture of tetramethoxysilane and dimethyldichlorosilane (tetramethoxysilane:dimethyldichlorosilane=1:1) was added as a coupling agent, and a coupling reaction was performed for 2 hours to yield a styrene-isoprene diblock copolymer.

Next, 4 parts of dehydrated styrene was added as an aromatic vinyl monomer, and stirring was performed for 60 minutes at 60° C. to carry out polymerization. The polymerization conversion rate at this point was almost 100%.

Next, 0.5 parts of isopropyl alcohol was added to the polymerization reaction liquid to terminate the reaction and yield a block copolymer. Note that the diblock content was 12%, the isoprene unit percentage content was 86%, and the styrene unit percentage content was 14%. The solution was further dissolved in toluene to obtain a polymer solution containing 25% block copolymer.

A mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content of 2%.

A tank was charged with 500 g of the obtained polymer solution and 500 g of the obtained aqueous solution, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/minute, and the preliminary mixture was stirred at a rotation speed of 20,000 rpm to cause phase-inversion emulsification of the preliminary mixture and obtain an emulsion.

Next, toluene in the resultant emulsion was removed by evaporation under reduced pressure in a rotary evaporator. The emulsion resulting from this evaporation was left to separate for 1 day in a chromatographic column equipped with a stop-cock, and a lower layer portion was removed after separation to perform concentration.

Finally, an upper layer portion was filtered through a 100-mesh screen to obtain a latex of a block copolymer having styrene regions and isoprene regions (water dispersion containing particulate polymer A; solid content concentration: 60%).

The resultant particulate polymer A had a volume average particle diameter of 0.9 μm. The diblock content of the resultant particulate polymer A was 12%. These values are shown in Table 1.

<Production of Particulate Polymer B>

A vessel A was charged with a mixture of 33 parts of 1,3-butadiene as an aliphatic conjugated diene monomer, 62 parts of styrene as an aromatic vinyl monomer, 4 parts of itaconic acid as a carboxylic acid group-containing monomer, 0.3 parts of tert-dodecyl mercaptan as a chain transfer agent, and 0.3 parts of sodium lauryl sulfate as an emulsifier. Polymerization was initiated by starting addition of the mixture from the vessel A to a pressure vessel B and simultaneously starting addition of 1 part of potassium persulfate to the pressure vessel B as a polymerization initiator. The reaction temperature was maintained at 75° C.

Once 4 hours had passed from the start of polymerization (after addition of 70% of the mixture to the pressure vessel B), 1 part of 2-hydroxyethyl acrylate (acrylic acid-2-hydroxyethyl) was added to the pressure vessel B as a hydroxy group-containing monomer over a period of 1 hour and 30 minutes.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a particulate polymer. The mixture containing the particulate polymer was adjusted to pH 8 through addition of 5% sodium hydroxide aqueous solution. Unreacted monomers were subsequently removed by distillation under heating and reduced pressure. Cooling was then performed to yield a water dispersion (solid content concentration: 40%) containing a particulate polymer B having a volume average particle diameter of 0.15 μm.

The resultant particulate polymer B had a volume average particle diameter of 0.15 μm. This value is shown in Table 1.

<Production of Binder Composition for Non-Aqueous Secondary Battery Electrode>

A mixture was obtained by charging a vessel with the block copolymer latex (water dispersion containing particulate polymer A) and the water dispersion containing the particulate polymer B obtained as described above such that the solid content ratio (A:B) of the particulate polymer A and the particulate polymer B was 70:30. The resultant mixture was stirred for 1 hour using a stirrer (produced by Shinto Scientific Co., Ltd.; product name: Three-One Motor) to yield a binder composition for a non-aqueous secondary battery electrode.

<Production of Slurry Composition for Non-Aqueous Secondary Battery Electrode (Negative Electrode)>

A planetary mixer equipped with a disper blade was charged with 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active materials, 1 part of carbon black (produced by Timcal Ltd.; product name: Super C65) as a conductive material, and 1.2 parts in terms of solid content of a 2% aqueous solution of carboxymethyl cellulose (produced by Nippon Paper Chemicals Co., Ltd.; product name: MAC-350HC) as a thickener to obtain a mixture. The resultant mixture was adjusted to a solid content concentration of 60% with deionized water and was subsequently mixed for 60 minutes at 25° C. Next, the mixture was adjusted to a solid content concentration of 52% with deionized water and was then further mixed for 15 minutes at 25° C. to yield a mixed liquid. Deionized water and 2.2 parts in terms of solid content of the binder composition for a non-aqueous secondary battery electrode produced as described above were added to the resultant mixed liquid, and the final solid content concentration was adjusted to 48%. Further mixing was performed for 10 minutes and then a defoaming process was carried out under reduced pressure to yield a slurry composition for a non-aqueous secondary battery electrode (negative electrode) having good fluidity.

The measured value for the tap density of the used negative electrode active material (average value of the artificial graphite and the natural graphite) was 0.85 g/cm³ (Table 1).

<Formation of Negative Electrode>

The obtained slurry composition for a non-aqueous secondary battery negative electrode was applied onto copper foil (current collector) of 20 μm in thickness using a comma coater such as to have a thickness of approximately 150 μm after drying. The applied slurry composition was dried by conveying the copper foil inside a 60° C. oven for 2 minutes at a speed of 0.5 m/minute. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

The peel strength of this negative electrode was evaluated. The results are shown in Table 1.

<Formation of Positive Electrode>

A slurry composition for a non-aqueous secondary battery positive electrode was obtained by combining 100 parts of $LiCoO_2$ having a volume average particle diameter of 12 μm as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder, and N-methylpyrrolidone as a solvent such as to have a total solid content concentration of 70%, and mixing these materials using a planetary mixer.

The obtained slurry composition for a non-aqueous secondary battery positive electrode was applied onto aluminum foil (current collector) of 20 in thickness using a comma coater such as to have a thickness of approximately 150 μm after drying. The applied slurry composition was dried by conveying the aluminum foil inside a 60° C. oven for 2 minutes at a speed of 0.5 m/minute. Thereafter, heat treatment was performed for 2 minutes at 120° C. to obtain a positive electrode web.

The resultant positive electrode web was rolled by a roll press to obtain a positive electrode including a positive electrode mixed material layer.

<Preparation of Separator>

A single-layer polypropylene separator (produced by Celgard, LLC.; product name: Celgard 2500) was used as a separator.

<Production of Non-Aqueous Secondary Battery>

The post-pressing positive electrode that was obtained was cut out as a 49 cm×5 cm rectangle and was placed with the surface at the positive electrode mixed material layer side of the positive electrode on top. A separator that had been cut out to 120 cm×5.5 cm in size was placed on the positive electrode mixed material layer such that the positive electrode was positioned at the longitudinal direction left-hand side of the separator. The post-pressing negative electrode that was obtained was cut out as a 50 cm×5.2 cm rectangle and was placed on the separator such that the surface at the negative electrode mixed material layer side of the negative electrode faced the separator and such that the negative electrode was positioned at the longitudinal direction right-hand side of the separator. The resultant laminate was wound by a winding machine to obtain a roll. This roll was enclosed in an aluminum packing case used as a battery case. An electrolysis solution (solvent: ethylene carbonate/diethyl carbonate/vinylene carbonate=68.5/30/1.5 (volume ratio); electrolyte: $LiPF_6$ of 1 M in concentration) was injected into the aluminum packing case such that no air remained, and then an opening of the aluminum packing case was heat sealed at 150° C. to close the aluminum packing case, and thereby produce a wound lithium ion secondary battery having a capacity of 800 mAh.

The cycle characteristics and rate characteristics of the produced lithium ion secondary battery were evaluated. The results are shown in Table 1.

Example 2

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the particulate polymer A, the amount of dehydrated isoprene was changed to 85 parts, the amount of dehydrated styrene was changed to 15 parts in total, and a styrene-isoprene diblock polymer was formed by adding 0.5 parts of dimethyldichlorosilane as a coupling agent and performing a coupling reaction for 2 hours to achieve a diblock content of 78%. Evaluations were conducted in the same manner as in Example 1. The results are shown in Table 1.

Example 3

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the particulate polymer A, a particulate polymer A having a volume average particle diameter of 2.1 µm was obtained by diluting the water dispersion containing the particulate polymer A to a concentration of 10% with deionized water, leaving the water dispersion for 30 days, and then separating a supernatant as a 15% portion from the top thereof. Evaluations were conducted in the same manner as in Example 1. The results are shown in Table 1.

Example 4

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the particulate polymer B, the amount of tert-dodecyl mercaptan was changed to 0.2 parts and the amount of sodium lauryl sulfate was changed to 0.1 parts so as to obtain a particulate polymer B having a volume average particle diameter of 0.35 µm. Evaluations were conducted in the same manner as in Example 1. The results are shown in Table 1.

Example 5

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the particulate polymer B, the amount of tert-dodecyl mercaptan was changed to 0.4 parts and the amount of sodium lauryl sulfate was changed to 0.5 parts so as to obtain a particulate polymer B having a volume average particle diameter of 0.09 µm. Evaluations were conducted in the same manner as in Example 1. The results are shown in Table 1.

Example 6

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the particulate polymer B, the amount of 1,3-butadiene was changed to 56 parts and the amount of styrene was changed to 39 parts. Evaluations were conducted in the same manner as in Example 1. The results are shown in Table 1.

Example 7

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the binder composition for a non-aqueous secondary battery electrode, the solid content ratio (A:B) of the particulate polymer A and the particulate polymer B was changed to 35:65. Evaluations were conducted in the same manner as in Example 1. The results are shown in Table 1.

Example 8

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the binder composition for a non-aqueous secondary battery electrode, the solid content ratio (A:B) of the particulate polymer A and the particulate polymer B was changed to 90:10. Evaluations were conducted in the same manner as in Example 1. The results are shown in Table 1.

Comparative Example 1

A particulate polymer A, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a particulate polymer B was not produced, and only the particulate polymer A was used in production of the binder composition for a non-aqueous secondary battery electrode (i.e., A:B was set as 100:0). Evaluations were conducted in the same manner as in Example 1. The results are shown in Table 1.

Comparative Example 2

A particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a particulate polymer A was not produced, and only the particulate polymer B was used in production of the binder composition for a non-aqueous secondary battery electrode (i.e., A:B was set as 0:100). Evaluations were conducted in the same manner as in Example 1. The results are shown in Table 1.

Comparative Example 3

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that a particulate polymer B (polyisoprene) produced as described below was used as the particulate polymer B. Evaluations were conducted in the same manner as in Example 1. The results are shown in Table 1.
<Production of Particulate Polymer B>

Isoprene rubber (produced by Zeon Corporation; product name: Nipol IR2200) was dissolved in toluene to prepare an isoprene rubber solution of 25% in concentration.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution of 2% in concentration.

A tank was charged with 500 g of the isoprene rubber solution and 500 g of the aqueous solution, and preliminary mixing of these materials was performed by stirring. Next, a metering pump was used to transfer the preliminary mixture from the tank to a Milder (produced by Pacific Machinery & Engineering Co., Ltd.; product name: MDN303V) at a rate of 100 g/minute, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

Finally, an upper layer portion was filtered through a 100-mesh screen to obtain a latex containing polyisoprene (PIP) as a particulate polymer B. The resultant polyisoprene latex had a solid content concentration of 60% and the volume average particle diameter was 1.2 μm.

Comparative Example 4

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the particulate polymer A, a particulate polymer A having a volume average particle diameter of 3.0 μm was obtained by diluting the water dispersion containing the particulate polymer A to a concentration of 10% with deionized water, leaving the water dispersion for 30 days, and then separating a supernatant as a 30% portion from the top thereof. Evaluations were conducted in the same manner as in Example 1. The results are shown in Table 1.

Comparative Example 5

A particulate polymer A, a particulate polymer B, a binder composition for a non-aqueous secondary battery electrode, a slurry composition for a non-aqueous secondary battery electrode, an electrode for a non-aqueous secondary battery, and a non-aqueous secondary battery were produced in the same way as in Example 1 with the exception that in production of the binder composition for a non-aqueous secondary battery electrode, the solid content ratio (A:B) of the particulate polymer A and the particulate polymer B was changed to 20:80. Evaluations were conducted in the same manner as in Example 1. The results are shown in Table 1.

In Table 1, shown below:
"IP" indicates isoprene unit;
"ST" indicates styrene unit;
"BD" indicates 1,3-butadiene unit;
"IA" indicates itaconic acid unit;
"β-HEA" indicates 2-hydroxyethyl acrylate unit;
"SBR" indicates styrene-butadiene copolymer; and
"PIP" indicates polyisoprene.

TABLE 1

| | | | | Example 1 | Example 2 | Example 3 | Example 4 | Example 5 | Example 6 | Example 7 |
|---|---|---|---|---|---|---|---|---|---|---|
| Binder composition for secondary battery electrode | Particulate polymer A | Volume average particle diameter (μm) | | 0.9 | 0.9 | 2.1 | 0.9 | 0.9 | 0.9 | 0.9 |
| | | Percentage content of aliphatic conjugated diene monomer unit (mass %) | IP | 86 | 85 | 86 | 86 | 86 | 86 | 86 |
| | | Percentage content of aromatic vinyl monomer unit (mass %) | ST | 14 | 15 | 14 | 14 | 14 | 14 | 14 |
| | | Diblock content (mass %) | | 12 | 78 | 12 | 12 | 12 | 12 | 12 |
| | Particulate polymer B | Volume average particle diameter (μm) | | 0.15 | 0.15 | 0.15 | 0.35 | 0.09 | 0.15 | 0.15 |
| | | Type | | SBR | SBR | SBR | SBR | SBR | SBR | SBR |
| | | Percentage content of aliphatic conjugated diene monomer unit (mass %) | BD | 33 | 33 | 33 | 33 | 33 | 56 | 33 |
| | | | IP | — | — | — | — | — | — | — |
| | | Percentage content of aromatic vinyl monomer unit (mass %) | ST | 62 | 62 | 62 | 62 | 62 | 39 | 62 |
| | | Percentage content of other monomer units (mass %) | IA | 4 | 4 | 4 | 4 | 4 | 4 | 4 |
| | | | β-HEA | 1 | 1 | 1 | 1 | 1 | 1 | 1 |

TABLE 1-continued

|  |  |  | Example 1 | Example 2 | Example 3 | Example 4 | Example 5 | Example 6 | Example 7 |
|---|---|---|---|---|---|---|---|---|---|
|  |  | Content ratio (A:B) of particulate polymer A and particulate polymer B | 70:30 | 70:30 | 70:30 | 70:30 | 70:30 | 70:30 | 35:65 |
| Negative electrode active material |  | Tap density (g/cm³) | 0.85 | 0.85 | 0.85 | 0.85 | 0.85 | 0.85 | 0.85 |
| Evaluation criteria |  | Peel strength | A | B | B | B | B | B | B |
|  |  | Cycle characteristics | A | A | B | B | B | B | B |
|  |  | Rate characteristics | A | A | A | A | A | A | B |

|  |  |  |  | Example 8 | Comparative Example 1 | Comparative Example 2 | Comparative Example 3 | Comparative Example 4 | Comparative Example 5 |
|---|---|---|---|---|---|---|---|---|---|
| Binder composition for secondary battery electrode | Particulate polymer A | Volume average particle diameter (μm) |  | 0.9 | 0.9 | — | 0.9 | 3.0 | 0.9 |
|  |  | Percentage content of aliphatic conjugated diene monomer unit (mass %) | IP | 86 | 86 | — | 86 | 86 | 86 |
|  |  | Percentage content of aromatic vinyl monomer unit (mass %) | ST | 14 | 14 | — | 14 | 14 | 14 |
|  |  | Diblock content (mass %) |  | 12 | 12 | — | 12 | 12 | 12 |
|  | Particulate polymer B | Volume average particle diameter (μm) |  | 0.15 | — | 0.15 | 1.2 | 0.15 | 0.15 |
|  |  | Type |  | SBR | — | SBR | PIP | SBR | SBR |
|  |  | Percentage content of aliphatic conjugated diene monomer unit (mass %) | BD | 33 | — | 33 | — | 33 | 33 |
|  |  |  | IP | — | — | — | 100 | — | — |
|  |  | Percentage content of aromatic vinyl monomer unit (mass %) | ST | 62 | — | 62 | — | 62 | 62 |
|  |  | Percentage content of other monomer units (mass %) | IA | 4 | — | 4 | — | 4 | 4 |
|  |  |  | β-HEA | 1 | — | 1 | — | 1 | 1 |
|  |  | Content ratio (A:B) of particulate polymer A and particulate polymer B |  | 70:30 | 100:0 | 0:100 | 70:30 | 70:30 | 20:80 |
| Negative electrode active material |  | Tap density (g/cm³) |  | 0.85 | 0.85 | 0.85 | 0.85 | 0.85 | 0.85 |
| Evaluation criteria |  | Peel strength |  | A | D | D | D | C | C |
|  |  | Cycle characteristics |  | A | C | C | C | C | C |
|  |  | Rate characteristics |  | A | B | C | B | B | C |

It can be seen from Table 1 that in Examples 1 to 8 in which the binder composition for a non-aqueous secondary battery electrode that was used contained both the particulate polymer A and the particulate polymer B, the peel strength of an electrode for a non-aqueous secondary battery and the high-temperature cycle characteristics of a non-aqueous secondary battery including this electrode were excellent compared to in Comparative Examples 1 and 2 in which the binder composition for a non-aqueous secondary battery electrode that was used only contained the particulate polymer A or the particulate polymer B.

Moreover, it can be seen that in Examples 1 to 8 in which the volume average particle diameter of the particulate polymer A was at least 0.6 μm and not more than 2.5 μm and the volume average particle diameter of the particulate polymer B was at least 0.01 μm and not more than 0.5 μm, the peel strength of an electrode and the high-temperature cycle characteristics of a secondary battery including this electrode were excellent compared to in Comparative Example 3 in which the volume average particle diameter of the particulate polymer B was more than 0.5 μm and Comparative Example 4 in which the volume average particle diameter of the particulate polymer A was more than 2.5 μm.

Furthermore, it can be seen that in Examples 1 to 8 in which the percentage content of the particulate polymer A was more than 30 mass % and not more than 90 mass % relative to total content of the particulate polymer A and the particulate polymer B, the peel strength of an electrode and the high-temperature cycle characteristics and low-temperature rate characteristics of a secondary battery including this electrode were excellent compared to in Comparative Example 5 in which the percentage content of the particulate polymer A was not more than 30 mass % relative to total content of the particulate polymer A and the particulate polymer B.

INDUSTRIAL APPLICABILITY

According to this disclosure, it is possible to provide a binder composition for a non-aqueous secondary battery electrode and a slurry composition for a non-aqueous secondary battery electrode that are capable of forming an electrode for a non-aqueous secondary battery that has excellent peel strength and can cause a non-aqueous secondary battery to display excellent cycle characteristics.

Moreover, according to this disclosure, it is possible to provide an electrode for a non-aqueous secondary battery that has excellent peel strength and can cause a non-aqueous secondary battery to display excellent cycle characteristics.

Furthermore, according to this disclosure, it is possible to provide a non-aqueous secondary battery having excellent battery characteristics such as cycle characteristics.

The invention claimed is:

1. A binder composition for a non-aqueous secondary battery electrode comprising:
a particulate polymer A which is a block copolymer having a diblock content of 5 mass % or more and 90 mass % or less; and a particulate polymer B which is a random copolymer, wherein the particulate polymer A has a volume average particle diameter of at least 0.9 µm and not more than 2.5 µm and includes an aliphatic conjugated diene monomer unit in a proportion of at least 50 mass % and not more than 90 mass %, the particulate polymer B has a volume average particle diameter of at least 0.01 µm and not more than 0.5 µm, the particulate polymer A has a percentage content of at least 70 mass % and not more than 90 mass % relative to a total content of the particulate polymer A and the particulate polymer B, the particulate polymer A includes an aromatic vinyl monomer unit in a proportion of at least 10 mass % and not more than 50 mass %, the particulate polymer B includes an aliphatic conjugated diene monomer unit in a proportion of at least 20 mass % and not more than 60 mass %, and the particulate polymer B includes an aromatic vinyl monomer unit in a proportion of at least 10 mass % and not more than 70 mass %.

2. A slurry composition for a non-aqueous secondary battery electrode comprising:
an electrode active material; and
the binder composition for a non-aqueous secondary battery electrode according to claim 1.

3. The slurry composition for a non-aqueous secondary battery electrode according to claim 2, wherein the electrode active material has a tap density of 1.1 g/cm$^3$ or less.

4. An electrode for a non-aqueous secondary battery comprising an electrode mixed material layer formed using the slurry composition for a non-aqueous secondary battery electrode according to claim 2.

5. A non-aqueous secondary battery comprising:
a positive electrode;
a negative electrode;
an electrolysis solution;
and a separator, wherein
at least one of the positive electrode and the negative electrode is the electrode for a non-aqueous secondary battery according to claim 4.

* * * * *